United States Patent

Suel, II

(10) Patent No.: US 9,267,226 B2
(45) Date of Patent: Feb. 23, 2016

(54) DYNAMIC UNBALANCE DETECTION IN A WASHING MACHINE

(75) Inventor: Richard D. Suel, II, Louisville, KY (US)

(73) Assignee: General Electric Company, Schenectady, NY (US)

(*) Notice: Subject to any disclaimer, the term of this patent is extended or adjusted under 35 U.S.C. 154(b) by 1001 days.

(21) Appl. No.: 13/365,568

(22) Filed: Feb. 3, 2012

(65) Prior Publication Data

US 2013/0199246 A1  Aug. 8, 2013

(51) Int. Cl.
*D06F 33/00* (2006.01)
*D06F 37/20* (2006.01)
*G01M 1/14* (2006.01)
*D06F 33/02* (2006.01)
*G01M 99/00* (2011.01)
*D06F 23/04* (2006.01)

(52) U.S. Cl.
CPC .............. *D06F 37/203* (2013.01); *D06F 33/02* (2013.01); *G01M 1/14* (2013.01); *G01M 99/005* (2013.01); *D06F 23/04* (2013.01); *D06F 2202/10* (2013.01); *D06F 2202/12* (2013.01); *D06F 2222/00* (2013.01)

(58) Field of Classification Search
CPC ..... D06F 37/203; D06F 39/003; D06F 33/02; D06F 35/007; D06F 37/225
USPC ................. 68/12.06, 12.02, 23.1, 12.04, 23.2, 68/12.16, 139, 12.27; 8/159, 158, 137
See application file for complete search history.

(56) References Cited

U.S. PATENT DOCUMENTS

| | | | |
|---|---|---|---|
| 7,581,272 | B2 | 9/2009 | Xie et al. |
| 2010/0241276 | A1 | 9/2010 | Zhang et al. |
| 2011/0185513 | A1* | 8/2011 | Suel et al. .................. 8/137 |

FOREIGN PATENT DOCUMENTS

| EP | 2 148 430 A1 | 1/2010 | |
|---|---|---|---|
| EP | 2148430 A1 * | 1/2010 | .............. D06F 37/20 |

* cited by examiner

*Primary Examiner* — Michael Barr
*Assistant Examiner* — Thomas Bucci
(74) *Attorney, Agent, or Firm* — Dority & Manning, P.A.

(57) ABSTRACT

A washing machine and method for detecting unbalance in a washing machine. A power filter may be calculated based on a detected load size, speed of a component of the washing machine, and/or a resonant frequency of the washing machine. An unbalanced indicator may be activated when a speed does not pass the power filter.

9 Claims, 7 Drawing Sheets

DYNAMIC UNBALANCE DETECTION IN A WASHING MACHINE

FIELD OF THE INVENTION

The present disclosure relates to a washing machine appliance and more particularly to a method for detecting unbalance based on the size of a load.

BACKGROUND OF THE INVENTION

Conventional washing machines typically include a cabinet which receives a stationary tub for containing wash and rinse water. A wash basket may be rotatably mounted within the wash tub. A drive assembly and a brake assembly can be positioned with respect to the wash tub and configured to rotate and control the rotation of the wash basket within the wash tub to cleanse the wash load placed into the wash basket. During e.g., a wash or spin cycle, water is typically extracted from the wash load by rotating the wash basket containing the wash load at high rotational speeds. Centrifugal forces pull the majority of the water out of the wash load and through perforations in the rotating basket. A pump assembly can be used to rinse and drain the extracted water to a draining system.

The rotating basket is typically supported by a suspension system designed to dampen translational motion induced by any imbalance within the rotating basket. High stresses are sometimes encountered within the basket, drive system, and suspension system during the high-speed spin action used for water extraction during normal wash cycles and may create unbalance within the washer. With an unbalance within the wash load, a force is generated which is proportional to the product of the mass of the load, the distance between the imbalance and the center of rotation of the tub, and the square of the velocity of the tub. Small imbalances can very easily generate large forces as a result of the high rotational velocities that may cause unbalance. When a load is out of balance, excess vibration and noise may cause damage to the washing machine.

Known washing machines may employ various sensing techniques to determine if the machine is operating with an unbalanced load. One technique may include current or load sensing in the motor control. When an unbalanced load is detected during an extraction spin cycle, the machine is stopped and a signal is generated to alert the user to the unbalanced load. Sensing techniques involving current or load sensing in the motor control can be inaccurate due to additional loads on the motor other than the load provided by any imbalance.

Another unbalance detection technique previously used may include a power filter preprogrammed in the washing machine controller. The variables of the machine may be considered and programmed prior to the appliance leaving the manufacturing factory. No further changes are made to the power filter and an out of balance detection may be inaccurate.

Thus, a need exists for an improved system and method for sensing unbalance in a washing machine that dynamically monitors the load size and calculates a power filter to limit power or torque based on the load size. A system and method for detecting unbalance that provides for improved unbalance detection dynamically as water is extracted from the tub may be particularly useful.

BRIEF DESCRIPTION OF THE INVENTION

Aspects and advantages of the invention will be set forth in part in the following description, or may be obvious from the description, or may be learned through practice of the invention.

In one exemplary embodiment, the present invention provides a method for identifying unbalance in a washing machine including detecting a load size of articles in a tub of the washing machine, determining power or torque required for a speed range based on the detected load size, and calculating a power filter based on the detected load size and determined power or torque required for a speed range.

In another exemplary embodiment, the present invention provides a washing machine including a tub rotatable around an axis, a motor coupled to the tub, a sensor for detecting rotational speed of the tub or motor, and a controller coupled to the motor and the sensor. The controller may be configured to detect a load size of articles in the tub, determine power or torque required for a speed range based on the detected load size, and calculate a power filter based on the detected load size and calculated power or torque required for a speed range.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
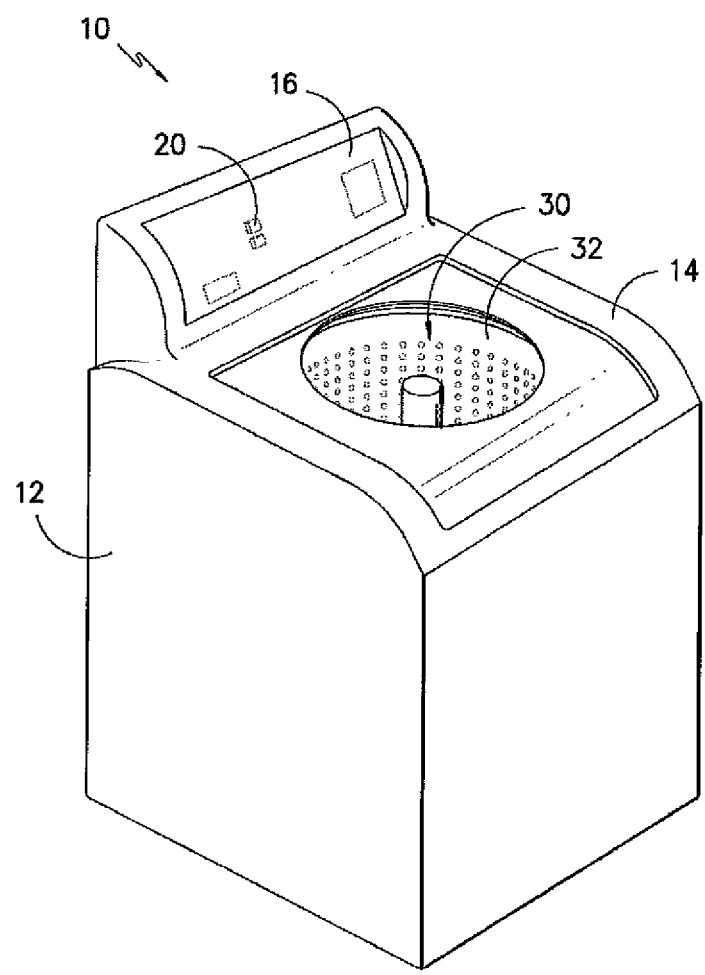
FIG. 1 provides a front, perspective view of an exemplary washing machine of the present invention.

The present invention relates to a washing machine and method for detecting unbalance in a washing machine. A power filter may be calculated based on a detected load size, speed of a component of the washing machine, and/or a resonant frequency of the washing machine. An unbalanced indicator may be activated when a speed does not pass the power filter.

Reference now will be made in detail to embodiments of the invention, one or more examples of which are illustrated in the drawings. Each example is provided by way of explanation of the invention, not a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view of an exemplary washing machine 10 according to an exemplary embodiment of the present disclosure. Washing machine 10 includes a cabinet 12 having a control panel or user interface 16 that extends from cover 14. User interface 16 includes a variety of appliance control input selectors 20 that may be for operator selection and display of washing cycles, features, machine status, and any other information of interest to users.

The user interface 16 may have various configurations, and controls may be mounted in other configurations and locations other than as shown in FIG. 1. One or more of a variety of electrical, mechanical, or electro-mechanical input devices including rotary dials, push buttons, and touch pads may also be used singularly or in combination with other types of input devices such as a touch screen or liquid crystal display. The user interface 16 may include a display component, such as a digital or analog display device designed to provide operational feedback to a user.

Figure 2:
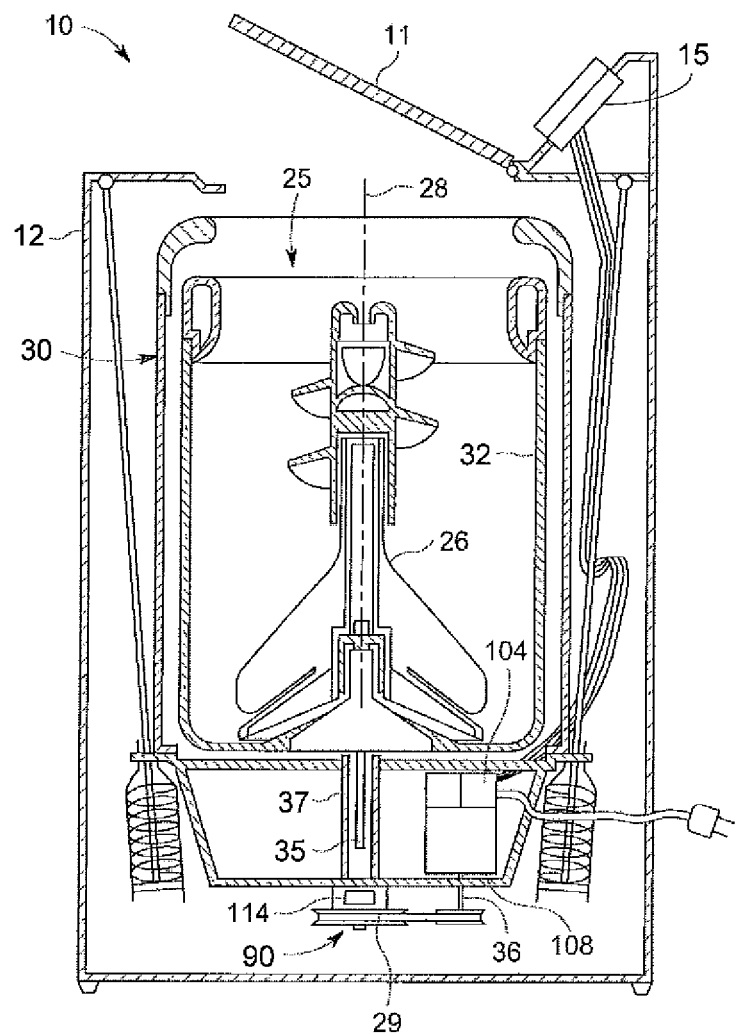
FIG. 2 provides a side, cross-sectional view of the exemplary embodiment of FIG. 1.

FIG. 2 provides a cross-sectional view of washing machine 10. A wash chamber 30 may be located within cabinet 12, and a wash basket or tub 32 may be rotatably mounted within wash chamber 30 in a spaced apart relationship from wash chamber 30 about vertical axis 28. Basket 32 may include a plurality of perforations therein to facilitate fluid communication between the interior of basket 32 and wash tub 30. Articles to be washed may be loaded into basket 32 through door 11 and opening 25. An agitator, impeller, or oscillatory basket mechanism 26 may be disposed in basket 32 to impart an oscillatory motion to articles and liquid in basket 32. Wash chamber 30 may also be in fluid communication with one or more pumps and/or drains (not shown) for the removal of water, such as grey water, from chamber 30 such as e.g., after a wash or rinse cycle.

Washing machine 10 may be controlled by a processing device or other controller 15, such as a microprocessor, according to user preference via manipulation of control input selectors 20 that may be mounted in user interface 16. Controller 15 and motor controller 104 may include a memory and microprocessor, CPU or the like, such as a general or special purpose microprocessor operable to execute programming instructions or micro-control code associated with washing machine control. The memory may represent random access memory such as DRAM, or read only memory such as ROM or FLASH. In one embodiment, the processor executes programming instructions stored in memory. The memory may be a separate component from the processor or may be included onboard within the processor. Alternatively controller 15 and motor controller 108 may be a single device. The controller 15 and motor controller 108 may be programmed to operate washing machine 10 according to the exemplary aspects of the present invention as set forth below.

As illustrated in FIGS. 1 and 2, agitator 26 may be oriented to rotate about a vertical axis 28. However, one of ordinary skill in the art would recognize that the wash basket 32 may be oriented to rotate around any axis, such as the vertical axis, horizontal axis or varying degree axis.

Motor 108 may provide for the movement of agitator 34 via drive arrangement 90. Drive arrangement 90 may include a pully mounted to a motor driveshaft 36 connected by belt 29 to a pulley mechanically coupled to basket driveshaft 35 and spin tube 37, which may be concentric shafts. Driveshaft 36 may be directly coupled to the pulley and belt 29 that drives the agitator 26. Alternatively, washing machine 10 may include any type of driving means such as a direct drive type having no belt or pulley. Spin tube 37 may be directly coupled to the basket 32 or it may be integral with the basket 32.

A clutch (not shown) may lock the basket driveshaft 35 and spin tube 37 when motor 108 is energized. Speed sensor 114 may be provided on motor driveshaft 36 and may be coupled with controller 15 and/or motor controller 104. While illustrated below the basket driveshaft 35, speed sensor 114 may be located in various locations in cabinet 12 and may be used to measure the speed of various components such as the basket driveshaft 35, motor driveshaft 36 and/or basket 32. A plurality of speed sensors 114 may also be used.

Figure 3:
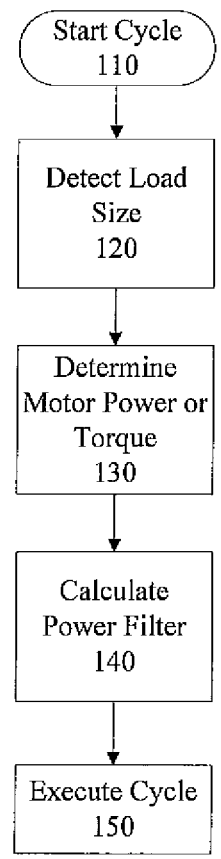
FIG. 3 provides a flow chart of a method for calculating a power filter according to an exemplary embodiment of the present disclosure.

FIG. 3 illustrates a flow chart of exemplary method steps of a method 100 according to an exemplary embodiment of the present disclosure. Method 100 may be performed by controller 15, motor controller 104 and/or a separate device.

Beginning at step 110, an operational cycle of the washing machine may be selected and initiated. A load size may be detected in step 120. The load size may be detected in various ways, such as before or after water is introduced into the tub, by weight sensors or by sensors coupled with the motor, motor shaft or tub. For example, a load size may be detected at the beginning of a spin cycle, after water has been drained from the tub following a rinse cycle.

During a washing cycle, the tub may be rotated at various speeds based on the selected cycle and the size of the load. The speeds used in a cycle may be predetermined or speeds may be individually calculated for each cycle based on the size of the load. Speed ranges have corresponding power or torque requirements. In other words, a certain amount of power/torque may be required to accelerate through a specific speed range. For slower speed cycles, such as a delicate cycle, and/or smaller load sizes, the power/torque requirements may be less than power/torque requirements for heavier loads and/or higher speed cycles, such as a normal spin cycle. In addition, the speed ranges may vary by cycles as a whole or may vary at time periods within a single cycle.

After the load size is detected, the motor power or torque requirements of the motor 108 may be determined in step 130. The power or torque may be determined in various ways such as a predetermined power or torque may correspond to a load size such as in a predetermined look up table or the power or torque may be individually calculated for each detected load size and speed range.

At step 140, a power filter is calculated based on the detected load size in step 120 and the determined power or torque for a speed range in step 130. In order to determine the power filter, speed range, time period, and power/torque requirements may be considered.

A power filter may define a region within a speed range over a time period. When a tub containing a load does not properly increase in speed according to the selected cycle within the time period outside the power filter region, the load may be determined to be unbalanced. Alternatively, the power filter may also consider power/torque requirements in determining the region. If the tub requires additional power or torque within the power filter region, the load may be determined to be unbalanced. When a load is balanced, a certain amount of power is necessary, when it is unbalanced, the same amount of power will not allow the tub to rotate at the same speed as a balanced load.

After a power filter is calculated in step 140, the washing machine executes the selected cycle including the power filter in step 150. The power filter may be calculated once or several times during the selected cycle. In addition, a plurality of power filters may be calculated and implemented within a single cycle.

Figure 4:
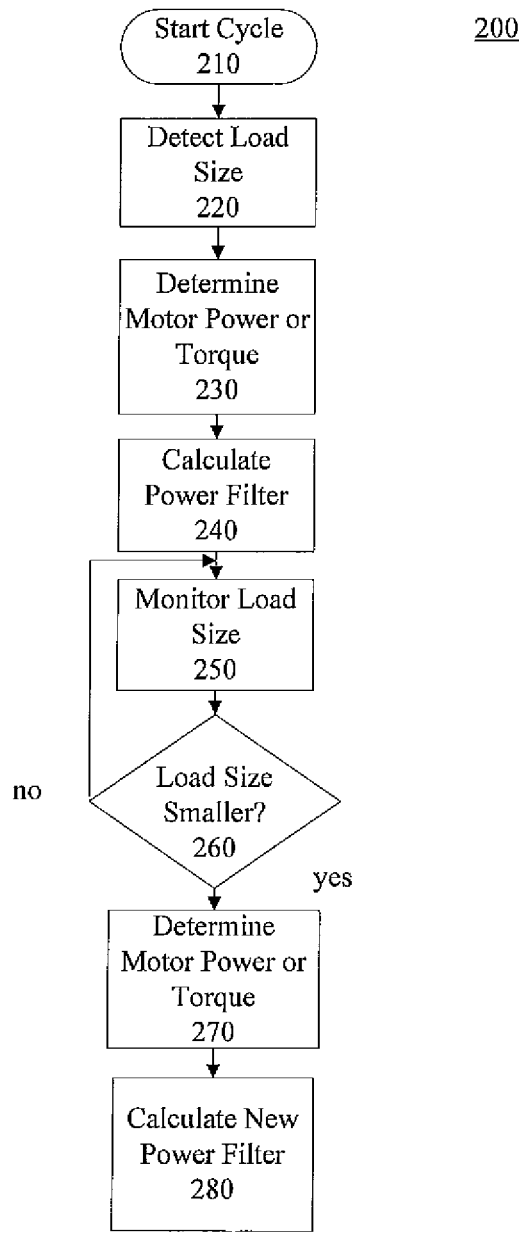
FIG. 4 provides a flow chart of a method for dynamically calculating a power filter according to an exemplary embodiment of the present disclosure.

In an exemplary embodiment shown in FIG. 4, a power filter may be dynamically calculated throughout the cycle. The method may be performed by controller 15, motor controller 104 and/or a separate device.

Starting at step 210, the cycle is initiated based on the selected cycle. The load size is detected at step 220 and the motor power or torque is determined in step 230. After a power filter is calculated in step 240, the size of the load is monitored in step 250 to determine if load size has been reduced. When the load is first detected, the measurement may include leftover water from a wash cycle. As the cycle progresses, water may be drained from the tub and articles within it, thus the size of a load may change throughout the cycle. In step 260, a determination is made whether the load size is smaller. If it is not smaller, the method returns to step 250 and monitors the size of the load. If the load size is smaller, then the power or torque of the motor is determined for the current load size in step 270 and a new power filter is calculated in step 280.

Figure 5:
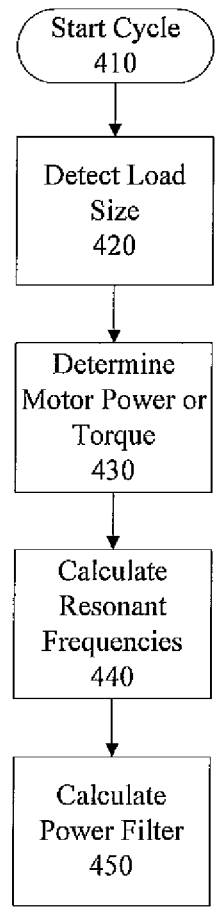
FIG. 5 provides a flow chart of a method for calculating a power filter according to an exemplary embodiment of the present disclosure.

As shown in FIG. 5, an exemplary embodiment includes a method 400 of calculating a power filter based on resonant frequencies of the washing machine. A resonant frequency may be a frequency at which the washing machine vibrates and may cause damage to the machine. After starting a cycle in step 410, a load size is detected in step 420 and the motor power or torque is determined in step 430. At least one resonant frequency is calculated in step 440, however a plurality of resonant frequencies may also be calculated. The resonant frequencies may be calculated using predetermined values or values detected within the washing machine. At least one power filter is calculated in step 450. However, more than one power filter may be calculated in step 450 where each power filter is based on each calculated resonant frequency.

Figure 6:
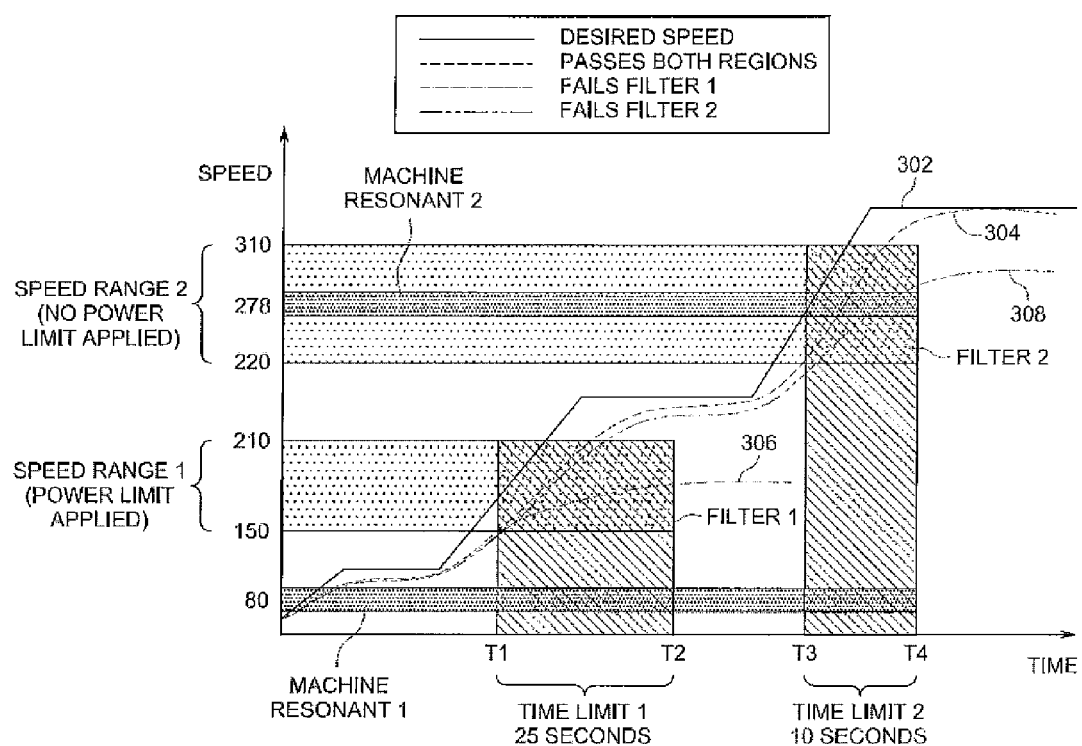
FIG. 6 provides a graph of a washing cycle according to an exemplary embodiment of the present disclosure.

With reference now to FIG. 6, an exemplary embodiment of the present disclosure is described. A wash cycle may be illustrated by plotting tub speed (RPM) against time. One of ordinary skill in the art would recognize that the plotted speed could alternatively be the speed of another element of washing machine 10 such as the basket driveshaft 35 or motor driveshaft 36.

In the particular machine of the illustrative embodiment, two resonant values are shown. More specifically, Machine Resonant 1 is near 80 RPM and Machine Resonant 2 is near 278 RPM.

Solid line 302 shows the desired basket speed (that is, an example RPM curve that successfully proceeds without failing either filter 1 or filter 2) as a function of time. By way of illustration, curve 302 includes plateaus to depict, by way of example, speed control for water extraction (from the clothing in the load) moments of a cycle. Curve 304 represents a successful spin that proceeds without failing either filter 1 or filter 2. Curves 306 and 308 represent example curves that proceed such that they do not successfully pass filter 1 and filter 2, respectively. In a first predetermined speed range, from 150 to 210 RPM, filter 1 is employed, wherein a power (or torque) limit is imposed and wherein the tub is expected to pass through the first predetermined speed range in no more than 25 seconds (between points T1 and T2). Here, the first range is between the first and second resonant frequencies. Curves 304 and 308 pass this first test. Curve 306 stalls and fails. In a second predetermined speed range, from 220 to 310 RPM, a second filter is applied. In this example, no torque or power limit is applied, but the basket is expected to pass through the second predetermined range in no more than 10 seconds (between points T3 and T4). Here, the second range brackets the second resonant frequency. Curve 304 passes this second test. Curve 308 stalls and fails. The goal for filter 1, which applies a power or torque limit, is to stop an unbalanced load before it approaches a resonant because once such a load reaches a resonant, the imbalance becomes amplified and the machine can produce significant vibration. With filter 2, if an unbalanced load were to reach a resonant and stall there, the lack of a power/torque limit would enable the machine to power the load through the resonant.

Thus, in one aspect, one or more embodiments of the invention provide a washing machine that incorporates a technique that identifies a highly out of balance mass at a speed outside any resonant frequency, as shown with respect to the first filter. This technique applies a predetermined power (or torque) limit while accelerating through a predetermined speed range and observes if the instantaneous speed reaches a predetermined level within a predetermined time limit. In some cases, the power limit is a predetermined level; in other cases, the torque limit is a predetermined level; in still other cases, the power and/or torque limits are non-linear. For example, the curve of the power/torque limit can appear more like a curve or a slope line; that is, it does not have to be flat. The technique described with respect to filter 1 can be repeated for multiple speed ranges and/or can be repeated at the same speed range (power may be varied during these repetitions). In some cases, the technique may be repeated multiple times at the same speed range with a varying time limit. By way of example, one or more embodiments of the invention can include using, as a starting point, very conservative power limits, and then if failures occurred, those power limits would be weakened (that is, allow more power/torque) incrementally until it is determined how much power/torque is required to send the a load through a resonance band (which also may indicate what the out of balance mass is). Accordingly, the goal and criterion used for defining a power/torque limit includes preventing a severe vibration issue caused by an imbalance.

Furthermore, in another aspect, one or more embodiments of the invention provide a clothes washer that incorporates a technique that identifies a high out of balance mass at or near a resonant frequency. As described, for example, with regard to filter 2, this technique applies a calculated power or torque, as described above, (which in general may or may not be limited) while accelerating through a predetermined speed range that encompasses a resonant frequency and observes if the instantaneous speed reaches a predetermined level within a predetermined time limit. In some cases, the power limit is a predetermined or calculated based on load size level; in other cases, the applied torque is a predetermined level or calculated based on load size; in still other cases, the applied power and/or torque are non-linear. In one or more embodiments of the invention, the criteria and/or design considerations can include determining which loads will desirably be stopped (that is, which loads should be allowed to spin up and which loads should not be allowed to spin up). The technique described with respect to filter 2 can be repeated for multiple speed ranges and/or can be repeated at the same speed range (power may be varied during these repetitions). In some cases, the technique may be repeated multiple times at the same speed range with a varying time limit.

Filter 2 advantageously provides an additional margin of safety in the event an unbalanced load makes it through filter 1. The goal in one or more embodiments is to attain, for loads that are not out of balance, a spin speed beyond the second resonance and beyond the second filter range.

Again, in one aspect, torque (or power) is limited in a predetermined angular velocity or speed range of a tub, such as between 150-210 RPM such that balanced loads will pass through, but unbalanced loads will fail to pass through. When ramping up in the spin cycle, the machine must pass through the predetermined speed range. If the clothes load is unbalanced, the torque or power applied by motor 108 may be insufficient to accelerate through this predetermined speed region within the allowed amount of time and the motor controller 104 may stop accelerating the motor 108. The controller 15 (for example, under the influence of suitable firmware or software) may also monitor the time (using, e.g., the timer not separately numbered) it takes for the load to get through the predetermined speed range. If the allowed time is exceeded, the load is considered unbalanced and corrective action will be taken. This aspect advantageously catches the case where an unbalanced load may eventually make it through the predetermined speed range if given enough time.

Figure 7:
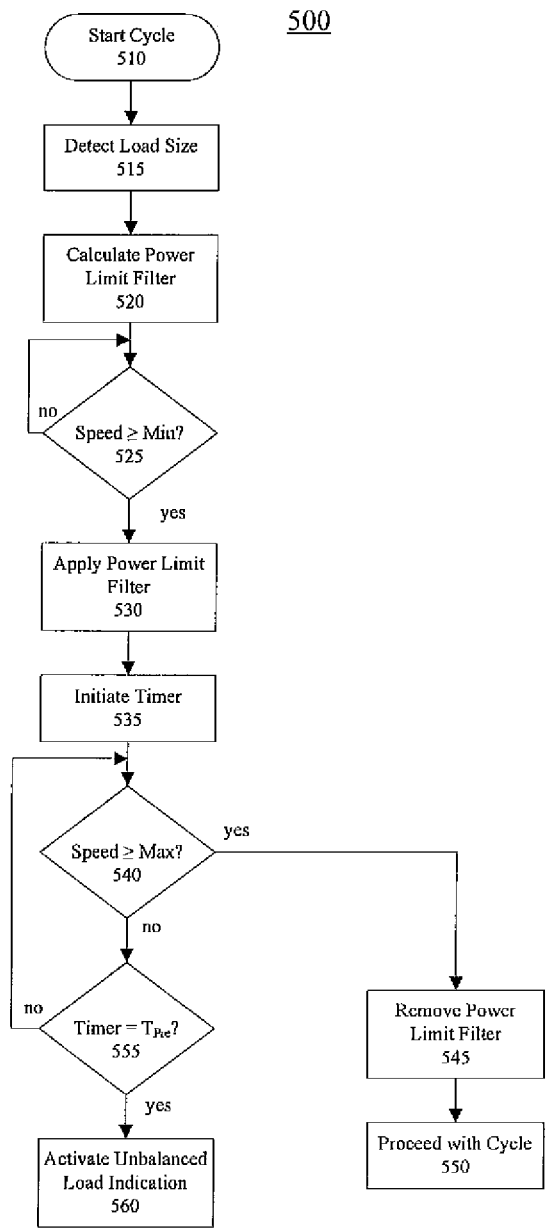
FIG. 7 provides a flow chart of a method for indicating unbalance according to an exemplary embodiment of the present disclosure.

FIG. 7 illustrates a flow chart of exemplary method steps of a method 500 according to an exemplary embodiment of the present disclosure. Method 500 may be performed by controller 15, motor controller 104, and/or a separate device.

A cycle may be initiated at step 510 and a load size may be detected at step 515. After the load size is detected, a power limit filter may be calculated in step 520 based on the detected load size. The power limit filter calculation can include determining a speed range having a minimum and maximum value and the amount of power needed to drive the driving means within the speed range, where the amount of power may be power or torque and can be a range of power or torque requirements. A speed range may be predetermined such as from a look up table or determined by any of the previously described methods. A single power limit filter may be calculated or a plurality of power limit filters may be calculated simultaneously in step 520. When a plurality of power limit filters are calculated, a driving power amount or range may be calculated for each speed range.

In step 525, the speed or torque can be monitored and/or detected to determine if a minimum speed has been reached. The speed or torque measurement may be of the tub or any portion of the driving means, such as the motor or the motor shaft. If the detected speed is less than a minimum speed value, the cycle may proceed and the speed can be monitored until the minimum speed range value has been reached. When the detected speed is greater than or equal to the minimum speed value, the calculated power limit filter may be applied in step 530. After the detected speed equals the minimum value in the speed range in step 525 and the power limit filter is applied in 530, a timer may be initiated in step 535. Alternatively, the system may monitor the range of power or torque required within the speed range and initiate a timer when the minimum power or torque requirement is reached.

After a timer is initiated in step 535, the speed or power/torque requirement is monitored to determine if it exceeds the maximum speed range or maximum power/torque value in step 540. If the detected speed or power/torque requirement is greater than a maximum speed or torque requirement in the range, the power limit filter may be removed in step 545 and the system may continue to proceed with the cycle.

However, when the timer reaches the end of the predetermined time interval ($T_{PRE}$) in step 555, the speed or torque can be detected and compared to the maximum speed or power/torque requirement range value. If the speed is within the speed or power/torque requirement range after the predetermined time interval and the maximum speed or power/torque range has not been reached, then an unbalanced load indication may be activated in step 560. The unbalanced load indication may be a visual or audio signal. Alternatively or in addition to the visual or audio signal, the cycle may be stopped until balance is returned to the load.

After the system proceeds with the cycle in step 550, additional power limit filters may be calculated using a similar method a plurality of times or may never be performed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for identifying unbalance in a washing machine comprising a controller programmed to perform the steps of:
    detecting a load size of articles in a tub of the washing machine;
    determining power or torque required for a speed range based on the detected load size; and
    calculating a power filter based on the detected load size and determined power or torque required for a speed range, wherein said power filter applies a predetermined power or torque limit while accelerating through a predetermined speed range and observes if the instantaneous speed reaches a predetermined level within a predetermined time limit, and
    updating said predetermined speed range or said predetermined time limit as speed and load size changes, and
    transforming a washing machine control cycle in accordance with said updated predetermined speed range or said updated predetermined time limit.

2. The method as in claim 1, wherein power or torque is calculated for a plurality of speed ranges and a plurality of power filters are determined based on the detected load size and the plurality of power or torque calculations.

3. The method as in claim 1, further comprising:
    calculating resonant frequencies based on the load size, wherein the power filter is determined based on the detected load size, the calculated power or torque and the calculated resonant frequencies.

4. The method as in claim 1, wherein the power filter limits an amount of power or torque supplied to the tub within a predetermined time interval.

5. The method as in claim 4, wherein the power filter limits an amount of power or torque supplied to the tub within a predetermined time interval and speed range.

6. The method as in claim 1, further comprising:
    detecting the load size a plurality of times during a cycle;
    determining the power or torque required for a speed range based on each detected load size; and
    calculating a power filter based on each detected load size and each calculated power or torque required for a speed range.

7. The method as in claim 1, further comprising:
    starting a washing machine cycle;

initializing a timer when a minimum speed of the speed range is reached;
applying the calculated power filter; and
indicating the load is unbalanced when the speed of the tub is between the minimum and maximum speed values of the speed range after a predetermined time interval.

8. The method as in claim 1, further comprising:
starting a washing machine cycle;
initializing a timer when the minimum power or torque value is reached;
applying the calculated power filter; and
indicating the load is unbalanced when the power or torque of the tub is between the minimum and maximum power or torque values after a predetermined time interval.

9. The method as in claim 1, wherein the speed range is based on a speed of the tub or a speed of a motor.

* * * * *